Sept. 16, 1947.  T. L. BORGOGNO  2,427,381
CHOCK OR SAFETY BLOCK
Filed Dec. 31, 1943

Inventor
Tony L. Borgogno
By H. Hamlin Hodges
his Attorney

Patented Sept. 16, 1947

2,427,381

UNITED STATES PATENT OFFICE 2,427,381

CHOCK OR SAFETY BLOCK

Tony L. Borgogno, Ogden, Utah

Application December 31, 1943, Serial No. 516,496

3 Claims. (Cl. 298—17)

My invention relates to a chock or safety block to be used on a truck having a dump body, the chock adapted to be positioned to secure the dump body in its dumping position until it is desired that the dump body be lowered to rest horizontally on the truck frame.

It has been found that numerous disastrous accidents have resulted from the dump body of a conventional dump truck dropping to assume its horizontal position when it is desired that the dump body be held in its dumping position. Very often it becomes necessary for mechanics or other laborers to work upon a dump truck at the time when the dump body is in an elevated position, and serious injuries often have resulted in the dump body accidentally changing position from its dumping position to its horizontal position on the truck frame.

An object of my invention is to provide a chuck means which will definitely maintain the dump body in its dumping position when desired.

A further object is to provide means whereby it will be impossible for the dump body of the truck to drop inadvertently and accidentally from its dumping position to a horizontal position on the truck frame.

Figure 1:
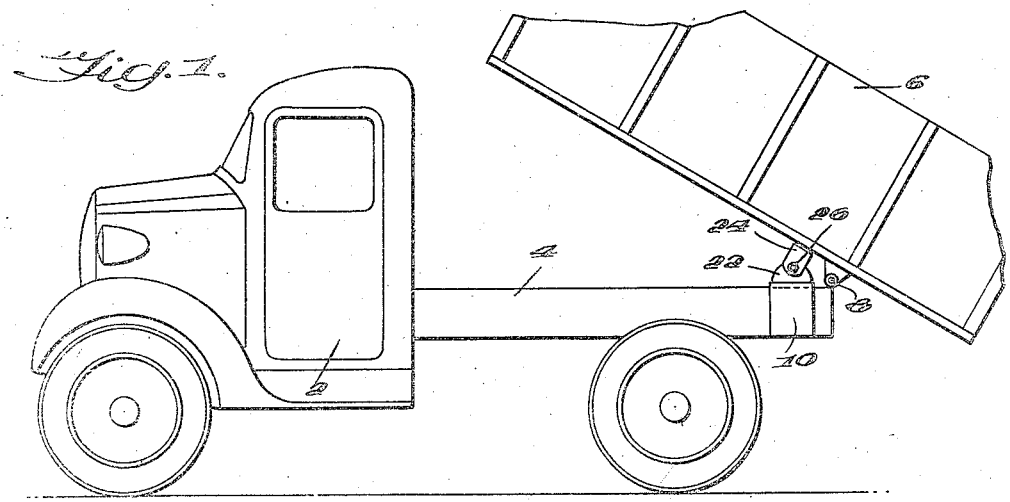
Fig. 1 is a side elevation of a conventional truck to which a dump body is pivotally affixed at the rear end of the truck frame.
Figure 2:
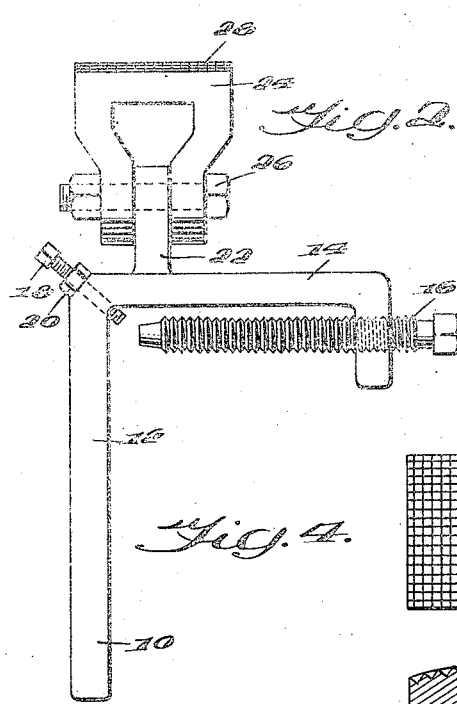
Fig. 2 is an enlarged view in side elevation of the chock.

The conventional truck 2 is provided with a conventionally constructed frame or chassis 4, to which at the rear end thereof the dump body 6 is pivotally secured by the pivot 8. The frame 4 is constructed of conventional channel-iron beams, and on the side beam (which is identified only by the reference character 4) my adjustable chock 10 may be readily secured in proper position beneath the bottom of the dump body 6, so that the dump body may not be lowered from the position in which it is shown in Fig. 1 without first removing the chock 10 from its adjusted position.

The chock 10 is made of a right-angle clamp having legs 12 and 14. The leg 12 is adapted to extend downwardly and be positioned against the channel-iron 4 of the truck frame, the leg 14 extending horizontally across the top of the channel-iron 4.

The leg 14 has one end thereof bent downwardly in a plane approximately parallel with the leg 11 and forming a foot 15, through which foot the set-screw 16 is screw-threaded.

In adjusting the chock upon the frame 4 of the truck 2, the clamp is placed over the frame, as described above, and the set-screw 16 is then tightened to hold securely the right-angle clamp in its position across the top of the channel-iron, by the end of the set-screw 16 being screwed tightly against one side of the channel iron frame 4, the other side of the channel iron frame 4 abutting against the leg 12 of the clamp. I provide an additional set-screw 18, which is screw-threaded through the angle or crotch of the right-angle clamp. This set-screw 18 extends entirely through the right-angle clamp, so that it may bear against the channel-iron frame 4, and may be permanently set in its adjusted position by tightening the lock-nut 20 thereon. On the leg 14 of the clamp I provide a suitable upstanding stud 22, to which is pivotally secured the chock or bifurcated head-piece 24 by means of the conventional nut and bolt 26 extending through the bifurcated head-piece and the lug 22. The head-piece 24 is provided on the upper portion thereof with a serrated face 28, which is preferably made of case-hardened steel or other suitable hard material, so that the serrated portion may properly become embedded in the bottom of the dump body 6, and can not slip from its adjusted position.

Figure 3:
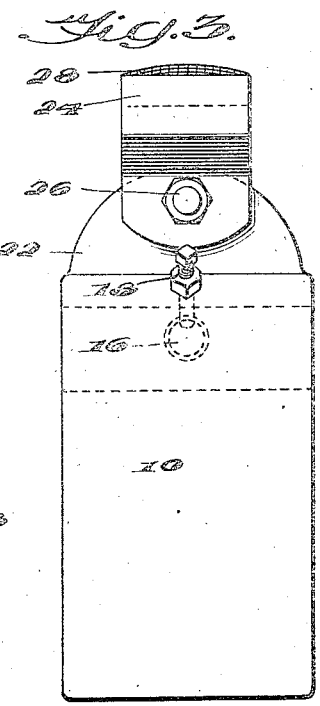
Fig. 3 is an enlarged view in front elevation.
Figure 4:
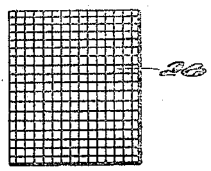
Fig. 4 is a plan view of the chock head.
Figure 5:
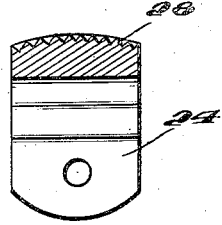
Fig. 5 is a vertical cross-section through the chock-head.

The lug 22 upstanding from the leg 14 is preferably semi-circular in side elevation, as clearly shown in Figs. 1 and 3. This provision is made so that the head 24 may be adjusted at any desired angle to assume its position between the frame 4 and the bottom of the dump body 6. By providing this semi-circular lug 22, the chock may be adjusted on either side of the truck frame. In other words, the chock may be considered as a universal chock, so that it might be positioned on whichever side of the truck frame is more easily accessible.

My chock or safety block is relatively small in size and may consequently be readily carried in a suitable tool-box or storage space customarily included in the standard equipment of every conventional dump truck, and may be readily and securely attached to the truck side frame and positioned beneath the floor or bottom of the dump body to hold the dump body in its elevated position, thus assuring that the dump body will not be inadvertently and accidentally lowered when not desired.

It will be understood that while I have particularly disclosed and described my chock as being adaptable to be applied to the frame of the dump truck and at a position between the frame and the bottom of the dump body, yet it will be understood that my chock and its associated clamping means may readily be fixed to either one or any two members which are pivotally connected, and which are adapted to be swung apart and held there so that their axes intersect at any angle other than a right-angle.

I claim:

1. A chock for dump vehicles or the like, having a frame to which a dump body is pivotally secured, including a right-angle clamp, a head pivotally secured to one leg of said clamp, a set-screw positioned approximately parallel to said leg and screw-threaded in a foot bent at approximately right-angles from the said leg, and a set-screw extending through the crotch between the legs of said clamp and adapted to engage the said frame on the side thereof opposite the point of engagement of the first-mentioned set-screw.

2. A chock for dump vehicles or the like, having a frame to which a dump body is pivotally secured, including a right-angle clamp, a stud extending from one leg of said clamp, an elongated set-screw approximately parallel to said leg and screw-threaded through a foot bent at approximately right-angles from an end of said leg, a set-screw extending through the joint between the legs of said clamp, and a block pivotally connected to the said stud extending from a leg of the said clamp.

3. In a vehicle having a pivotally mounted dump body thereon, a frame, a right-angle clamp adapted to fit over and be secured to a side of said frame, said clamp having a set-screw screw-threaded to a foot bent at approximately right-angles from an end of one leg of said clamp and being approximately parallel to the said leg and adapted to engage the said side frame between itself and the other leg of the clamp, a chock pivotally secured to the leg of clamp parallel to said set-screw, and a second set-screw adapted to engage said frame on the side thereof opposite to the first-mentioned set-screw.

TONY L. BORGOGNO.

REFERENCES CITED

The following references are of record in the file of this patent:

UNITED STATES PATENTS

| Number | Name | Date |
|---|---|---|
| 2,274,074 | Lavalier | Feb. 24, 1942 |
| 1,372,431 | Husi | Mar. 22, 1921 |
| 1,786,902 | Doughty, Jr. | Dec. 30, 1930 |